United States Patent [19]
Peterson et al.

[11] Patent Number: 6,149,817
[45] Date of Patent: Nov. 21, 2000

[54] SHELL-LESS HOLLOW FIBER MEMBRANE FLUID CONTACTOR

[75] Inventors: Paul A. Peterson; Charles James Runkle; Amitava Sengupta; Frederick E. Wiesler, all of Charlotte, N.C.

[73] Assignee: Celgard Inc., Charlotte, N.C.

[21] Appl. No.: 09/265,064

[22] Filed: Mar. 8, 1999

[51] Int. Cl.⁷ .......................... B01D 59/12; B01D 63/02
[52] U.S. Cl. .............. 210/644; 210/500.23; 210/321.78; 210/321.8; 210/321.88
[58] Field of Search ............... 210/650, 500.23, 210/321.78, 321.79, 321.8, 321.87, 321.88, 321.89, 644, 640

[56] References Cited

U.S. PATENT DOCUMENTS

| | | |
|---|---|---|
| 4,220,535 | 9/1980 | Leonard . |
| 4,622,143 | 11/1986 | Edwards .................................. 210/439 |
| 4,675,109 | 6/1987 | Applegate et al. .................. 210/321.6 |
| 4,752,305 | 6/1988 | Johnson ................. 210/321.8 |
| 5,137,631 | 8/1992 | Eckman et al. ....................... 210/321.8 |
| 5,248,424 | 9/1993 | Cote et al. ............................... 210/636 |
| 5,284,584 | 2/1994 | Huang et al. ....................... 210/321.61 |
| 5,352,361 | 10/1994 | Prasad et al. ..................... 210/321.81 |
| 5,470,469 | 11/1995 | Eckman ................................ 210/321.8 |
| 5,607,593 | 3/1997 | Cote et al. ............................... 210/650 |
| 5,643,455 | 7/1997 | Kopp et al. ............................. 210/636 |
| 5,783,083 | 7/1998 | Henshaw et al. ....................... 210/636 |
| 5,922,201 | 7/1999 | Yamamori et al. ................ 210/321.79 |
| 5,944,997 | 8/1999 | Pedersen et al. ....................... 210/636 |
| 5,958,243 | 9/1999 | Lawrence et al. ..................... 210/636 |

*Primary Examiner*—Ana Fortuna
*Attorney, Agent, or Firm*—Robert H. Hammer, III

[57] ABSTRACT

A shell-less fluid contactor and a process for transferring a fluid component between a shell-side fluid and a lumen-side fluid. The shell-side fluid is introduced through a fluid distribution tube and discharged from the tube into contact with a surrounding bundle of microporous hollow fiber membranes. A fluid component is transferred by diffusion, through the walls of the hollow fiber membranes, from the shell-side fluid to the lumen-side fluid. Multiple contactors can be combined into an assembly for multi-stage processing of fluids.

20 Claims, 5 Drawing Sheets

SHELL-LESS HOLLOW FIBER MEMBRANE FLUID CONTACTOR

BACKGROUND OF THE INVENTION

1. Field of the Invention

The present invention relates generally to membrane contactors for fluid separation and processing, and more particularly to shell-less hollow fiber membrane contactors and methods of fluid processing utilizing shell-less hollow fiber membrane contactors.

2. Description of Related Art

Membrane contactors provide a means of accomplishing gas/liquid, and liquid/liquid (which can encompass liquid/dissolved solid) separations. Membrane contactors typically are used to bring two immiscible fluid phases-for example, a first liquid and a second liquid, or a gas and a liquid-into contact with one another to effect separation and/or transfer of one or more components from one fluid to the other.

A membrane contactor is a modular device, commonly including a bundle of microporous hollow fibers. Membrane contactors typically include a rigid shell or housing enclosing the fiber bundle. The shell typically is provided with four fluid ports: an inlet for introducing the first fluid, an outlet for discharging the first fluid, an inlet for introducing the second fluid, and an outlet for discharging the second fluid. The hollow fibers are potted on both ends, within the housing, to form polymeric tube sheets with the fiber bores opening on each end into common first and second end cap portions of the shell. The first end cap contains the inlet for the first fluid, which is designated the "tube-side" or "lumen-side" fluid because it is the fluid that passes through the internal lumens of the fibers. The second end cap contains the outlet for discharging the lumen-side fluid. The second fluid, designated the "shell-side" fluid, typically enters and exits the housing through inlet and outlet ports arranged between the tube sheets, whereby the shell-side fluid contacts the external surfaces of the fibers. The shell-side fluid flows through the interstices between fibers of the fiber bundle, and may be directed to flow parallel or perpendicular to the fiber length. U.S. Pat. No. 5,352,361 to Prasad, et al., incorporated by reference herein in its entirety, may assist in a background understanding of fluid contact across hollow fiber membranes within a shell.

Because the tube sheets separate the lumen-side fluid from the shell-side fluid, the lumen-side fluid does not mix with the shell-side fluid, and the only transfer between the lumen-side fluid and the shell-side fluid occurs through the walls of the fibers. The fine pores in the fiber wall are normally filled with a stationary layer of one of the two fluids, the other fluid being excluded from the pores due to surface tension and/or pressure differential effects. Mass transfer and separation are caused by diffusion, which is driven by the difference in concentration of the transferring species between the two phases. Typically, no convective or bulk flow occurs across the membrane.

In the case of gas/liquid separations, membrane contactors are typically fabricated with hydrophobic hollow fiber microporous membranes. Since the membranes are hydrophobic and have very small pores, liquid will not easily pass through the pores. The membranes act as an inert support that brings the liquid and gas phases into direct contact, without dispersion. The mass transfer between the two phases is governed by the difference in partial pressure of the gas species being transferred.

For liquid systems, the liquid/liquid interface at each pore is typically immobilized by the appropriate selection of membrane and liquid phase pressures. In this case, the membrane also acts as an inert support to facilitate direct contacting of two immiscible phases without mixing.

Membrane contactors can be utilized for a variety of applications, including the separation of a component from a fluid or transferring a component of one fluid to another. For example, a membrane contactor can be used in removal of contaminants from an effluent stream. In many industrial processes, a contaminated effluent stream is generated as a by-product. In view of environmental concerns, and/or efforts to improve process efficiency, it is often desirable to remove one or more contaminants from the effluent stream so that the contaminant does not pollute the environment, or so that it may be recycled. Existing industrial processes frequently must be upgraded to reduce environmental emissions and/or increase efficiency. Therefore, a need often arises for a process and system that can be economically retrofit to an existing plant to reduce emissions.

Several factors are important in the design of membrane contactors, including separation characteristics, cost, pressure drop, weight, and efficiency. The pressure drop across a contactor should be low to reduce the need for more expensive high pressure equipment. Low pressure drop is of particular importance in retrofit projects where a membrane contactor is to be added at the discharge point of an effluent process stream, as the process pressure at this point is typically at or near atmospheric pressure. High efficiency of mass transfer is desirable for reducing the size of the contactor. Low weight is desirable for decreasing installation and maintenance costs, and is of particular importance in offshore applications. Existing membrane contactors have been found less than fully satisfactory in meeting these goals. For example, the shell portion of typical membrane contactors adds considerably to their weight and expense. Shell-type contactors also typically must operate at elevated pressures. Accordingly, a need exists for a membrane contactor having improved characteristics over known membrane contactors.

It is to the provision of a microporous hollow fiber membrane device and method meeting these and other needs that the present invention is primarily directed.

SUMMARY OF THE INVENTION

The present invention provides a simple, low cost, efficient membrane contactor having no outer shell or housing. The absence of a shell allows the contactor of the present invention to be readily added at or near the discharge point of an effluent stream to remove contaminant or otherwise process the stream by membrane-aided diffusion. The membrane contactor of the present invention generates little or no back-pressure in operation, thereby minimizing any associated pressure drop and reducing the need for additional pumps, fans or other motive means. Absence of a shell also reduces weight and material cost.

In a preferred form of the present invention, a shell-side fluid from an external source enters the contactor through a fluid distribution element around which at least one and preferably a bundle of hollow fiber membranes is assembled. The shell-side fluid is discharged from the fluid distribution element into contact with the external surfaces of the hollow fiber membranes. There is preferably no convective flow of fluid across the hollow fiber wall. Only a small fraction of the process fluid transfers across the hollow fiber wall by diffusion, the diffusion being caused by a mass transfer driving force, which is typically a difference in chemical potential of the transferring species between the shell-side fluid and a lumen-side fluid. The hollow fibers can be open on one end into a single common end cap; or alternatively, open at both ends into two separate end caps, one end cap provided at each end of the fibers. In alternate embodiments, the hollow fibers can be arranged in a generally U-shaped array, with their inlets adjacent their outlets. A tube sheet or other barrier provides a fluid-tight seal separating the shell-side fluid from the lumen-side fluid carried within the lumens of the hollow fiber membranes. The tube sheets preferably are permanently attached to the fluid distribution element, which serves to support the tube sheets rigidly in position. One or more end caps can be permanently attached to the fluid distribution element and/or tube sheets, thereby forming a part of the membrane contactor. Alternatively, the membrane contactor can take the form of a replaceable cartridge, releasably connectable to external end cap(s) or other external structure of a fluid delivery system, through fluid-tight releasable sealing means, such as for example, a gasket or O-ring and a releasable clamp or connector.

The membrane contactor of the present invention is applicable to a variety of uses, including without limitation: the separation of one or more components from a fluid; transferring a component of one fluid to another fluid; separation of impurities or toxins from contaminated process water, waste gasses or other fluids; degassing liquids by vacuum or sweep fluid; selective extraction of organics from aqueous fluids; and extraction of dissolved inorganic salts from organic solvents.

Briefly described, in a preferred form, one aspect of the present invention provides a shell-less fluid contactor including a fluid distribution element having at least one inlet for receiving a shell-side fluid, and at least one outlet for discharging the shell-side fluid. The contactor preferably further includes at least one hollow fiber membrane having a microporous wall, the microporous wall having an internal surface defining a lumen and an external surface exposed to contact with the shell-side fluid, each hollow fiber membrane further comprising a first port in fluid communication with the lumen. The contactor preferably further includes a barrier for separating the first port of each hollow fiber membrane from the shell-side fluid.

In another aspect, the present invention provides a fluid contactor for transferring at least one component of a shell-side fluid to a lumen-side fluid. The fluid contactor preferably includes a substantially rigid fluid distribution tube having a wall defining an external surface and an internal passage, an open first end in fluid communication with the internal passage and forming an inlet for receiving a shell-side fluid, and a closed second end opposite the first end. The wall of the fluid distribution tube preferably includes a perforated wall section having a plurality of discharge openings for discharging the shell-side fluid from the internal passage. The fluid contactor preferably also includes a tube sheet mounted in sealing engagement with the external surface of the fluid distribution tube between the first end of the fluid distribution tube and the perforated wall section, and a support member mounted to the fluid distribution tube adjacent the second end thereof. The fluid contactor preferably also includes a plurality of hollow fiber membranes surrounding the fluid distribution tube, each hollow fiber membrane having a first end, a second end, an internal lumen for transmitting a lumen-side fluid, and an external surface. The first end of each hollow fiber membrane preferably extends sealingly through the tube sheet, the second end of each hollow fiber membrane is attached to said support member, and at least a portion of the external surface of each hollow fiber membrane is exposed to the ambient. In one embodiment, the support member comprises a closure block for closing the second ends of the hollow fiber membranes to passage of the lumen-side fluid. In an alternate embodiment, the support member comprises a second tube sheet providing passage of the lumen-side fluid through ports in the second ends of the hollow fiber membranes.

In yet another aspect, the present invention provides a multi-stage assembly for fluid processing. In preferred form, the assembly includes a first stage comprising a first shell-less fluid contactor having a fluid distribution element with at least one inlet for receiving a shell-side fluid, and at least one outlet for discharging the shell-side fluid. The first shell-less fluid contactor also includes at least one hollow fiber membrane having a microporous wall with an internal surface defining a lumen and an external surface exposed to contact with the shell-side fluid. Each hollow fiber membrane has a first port in fluid communication with the lumen. The first shell-less fluid contactor also includes a barrier for separating the first port of each said at least one hollow fiber membrane from the shell-side fluid. The assembly preferably also includes a second stage comprising a second fluid contactor. The second fluid contactor includes a fluid distribution element having at least one inlet for receiving a shell-side fluid, and at least one outlet for discharging the shell-side fluid. The second fluid contactor also includes at least one hollow fiber membrane with a microporous wall, the microporous wall having an internal surface defining a lumen and an external surface exposed to contact with the shell-side fluid. Each hollow fiber membrane also has a first port in fluid communication with the lumen. The second fluid contactor also includes a barrier for separating the first port of each hollow fiber membrane from the shell-side fluid. The assembly preferably also includes collection and transfer means for collecting the shell-side fluid discharged from the at least one outlet of the first fluid contactor, and transferring the collected shell-side fluid to the at least one inlet of the second fluid contactor. Depending on the desired application, three or more stages may be provided.

In still another aspect, the present invention provides a process for transferring a fluid component between a shell-side fluid and a lumen-side fluid. The process includes the steps of introducing a shell-side fluid into a fluid distribution element of a shell-less fluid contactor; introducing a lumen-side fluid into a lumen of at least one hollow fiber membrane external of the fluid distribution element; and discharging the shell-side fluid from the fluid distribution element into contact with the at least one hollow fiber membrane to effect a transfer of a fluid component between the shell-side fluid and the lumen-side fluid.

These and other features and advantages of preferred forms of the present invention are described herein with reference to the drawing figures.

BRIEF DESCRIPTION OF THE DRAWING FIGURES

DETAILED DESCRIPTION

Figure 1:
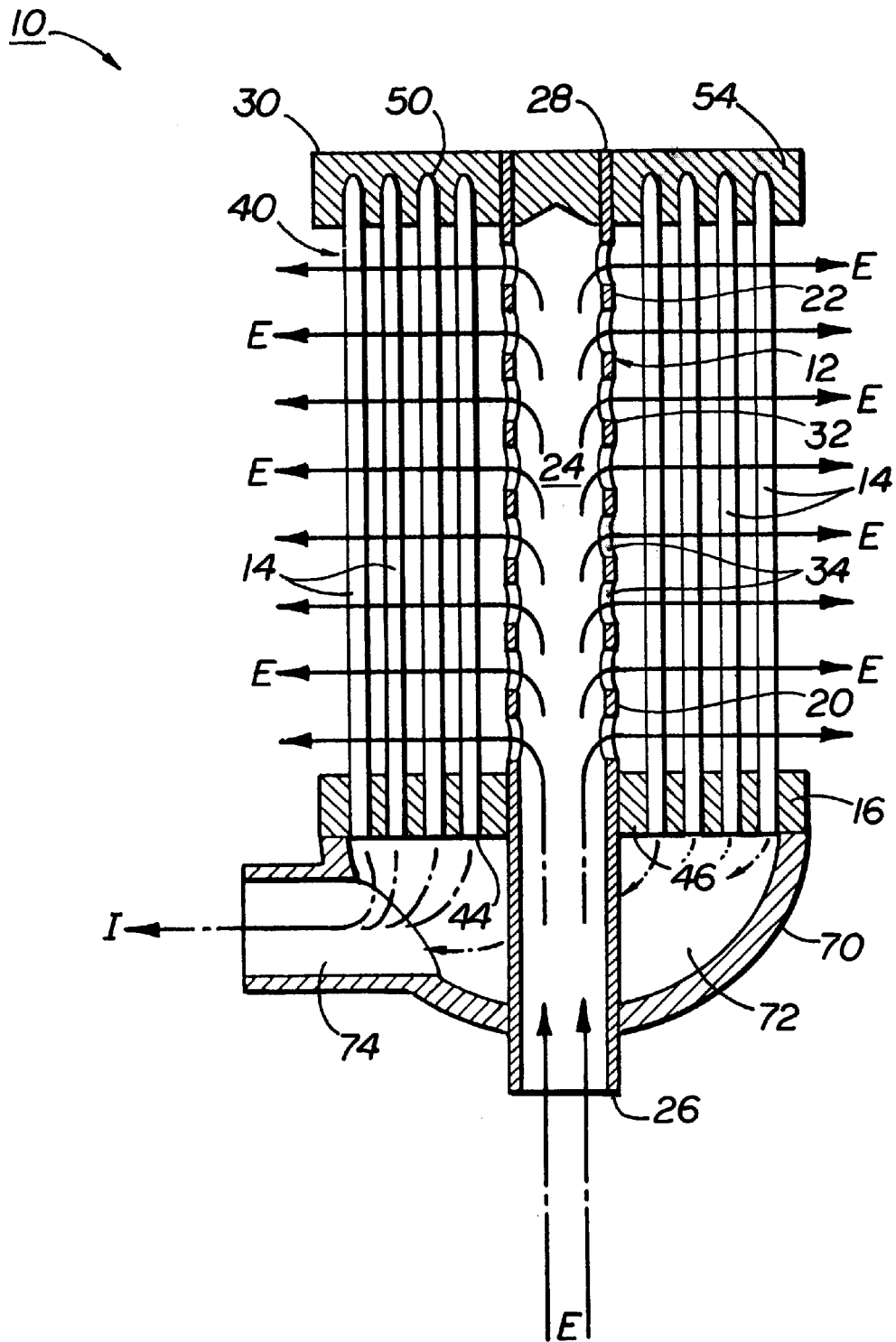
FIG. 1 shows a membrane contactor, in partial cross-sectional view, according to a preferred form of the present invention.

Referring now to the drawing figures, wherein like reference numerals represent like parts throughout, preferred forms of the present invention will now be described. FIGS. 1–4 show example embodiments of a shell-less membrane contactor 10 according to preferred forms of the present invention. The membrane contactor 10 generally comprises a fluid distribution element 12, at least one hollow fiber membrane 14, and a barrier 16. Each of these components, and a number of additional elements optionally provided in various preferred embodiments, are described in greater detail below.

With reference generally to FIGS. 1–4, in preferred forms, the fluid distribution element of the present invention comprises a substantially rigid fluid distribution tube 20 having a wall defining an external surface 22 and an internal passage 24. The fluid distribution tube 20 is preferably a generally cylindrical element fabricated from plastics, polyolefins, polypropylene, metals, or other material(s) that are inert, or non-reactive with the materials in the fluid streams or contaminants intended to be processed. Alternatively, the fluid distribution tube 20 can comprise a tube of generally square or otherwise shaped cross-section. A first end 26 of the fluid distribution tube 20 is open to form an inlet for receiving a shell-side fluid E from an external source, and communicates the shell-side fluid E to the internal passage 24. The first end 26 can be provided with threads or other couplings for attachment to piping or tubing associated with the external source. A second end 28 of the fluid distribution tube 20, generally opposite the first end 26 is preferably closed to flow of the shell-side fluid E. According to the preferred embodiment depicted in the figures, the second end 28 is closed by mounting a support member 30 on or adjacent the second end 28. Alternatively, the second end 28 may be closed by forming the fluid distribution tube 20 as a closed cylinder, by deforming the fluid distribution tube 20, by means of a plug, or by other closure means. The fluid distribution tube 20 preferably includes a perforated wall section 32, comprising one or more discharge openings or outlets 34 for discharging the shell-side fluid E from the internal passage 24. Preferably, a plurality of discharge openings 34 are provided generally evenly distributed over the perforated wall section 32. The discharge openings 34 preferably extend generally radially outwardly from the internal passage 24 to the external surface 22.

One or more hollow fiber membranes 14 are also provided. In preferred form, a plurality of hollow fiber membranes 14 are provided, forming a fiber bundle 40. The fiber bundle 40 preferably generally surrounds at least a portion of the perforated wall section 32. The hollow fiber membranes 14 can take any of a number of forms, depending upon the desired application. For example, the hollow fiber membranes 14 can be homogenous or asymmetric in terms of pore morphology, may or may not have a non-porous dense outside skin or a composite structure, and may or may not be permselective (having a higher permeability to one species or component than to another) to any of the process fluid components. Examples of hollow fiber membranes that may find applicability with the present invention include permselective fiber membranes commercially available from Celgard, LLC, of Charlotte, N.C. under the name of Celgard Hollow Fiber Membranes; from Dainippon Ink and Chemicals, Inc. of Japan; or from Akzo-Nobel, of the Netherlands. Each hollow fiber membrane 14 preferably comprises a microporous wall having a multiplicity of micropores therethrough, an internal surface defining an internal lumen, and an external surface.

Each hollow fiber membrane 14 has a first end 44 extending through and having its external surface in sealing contact with the barrier 16, whereby the barrier functions as a tube sheet. The first ends 44 are preferably cut off or otherwise terminate approximately flush with an outer surface 46 of the tube sheet 16, the outer surface 46 lying opposite the tube sheet from the perforated wall section 32 of the fluid distribution tube 20. The open first ends 44 form ports communicating a lumen-side fluid I to and/or from the lumens of the hollow fiber membranes 14. The tube sheet 16 is preferably formed from a polymeric potting resin (as used herein, a "polymeric" potting resin refers to any thermoplastic or thermoset potting resin). The tube sheet 16 is preferably formed around or otherwise mounted in sealing engagement with the external surface 22 of the fluid distribution tube 20, between the first end 26 and the perforated wall section 32. Example materials and methods of construction of the various components of the present invention not specifically described herein will be readily apparent to those skilled in the art. The reader is also directed to U.S. Pat. No. 4,220,535 to Leonard; U.S. Pat. No. 5,284,584 to Huang et al.; and U.S. Pat. No. 5,352,361 Prasad et al., all of which are incorporated herein by reference in their entireties, for additional background information regarding materials and methods of construction applicable to the present invention.

Second ends 50 of the hollow fiber membranes 14 are preferably supported by a support member 30 mounted adjacent the second end 28 of the fluid distribution tube 20. In this manner, the hollow fiber membranes 14 are maintained in an extended configuration, with their first ends sealingly engaged by the tube sheet 16 and their second ends sealingly engaged by the support member 30, and with at least a portion of their external surfaces between the tube sheet 16 and the support member 30 exposed to contact with shell-side fluid E discharged from the perforated wall section 32 of the fluid distribution tube 20. With particular reference to FIG. 1, the support member 30 can take the form of a closure block 54, serving to close the second end 28 of the fluid distribution tube 20 against passage of shell-side fluid E, and serving to encapsulate or otherwise close the second ends 50 of the hollow fiber membranes 14 to prevent passage of lumen-side fluid I. The closure block is preferably formed from a polymeric potting resin similar to the material of the tube sheet 16.

Figure 2:
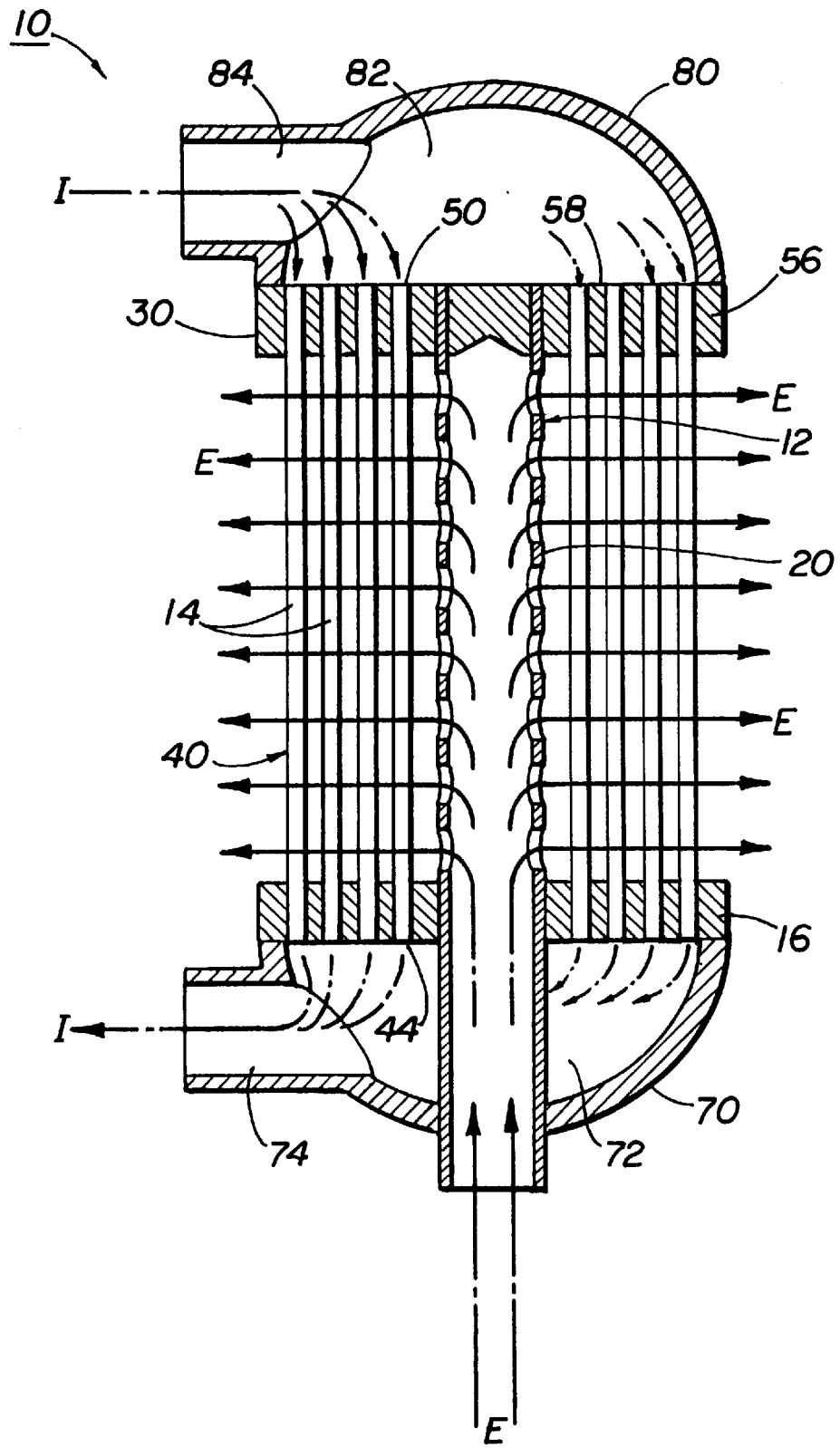
FIG. 2 shows a membrane contactor, in partial cross-sectional view, according to another preferred form of the present invention.
Figure 3:
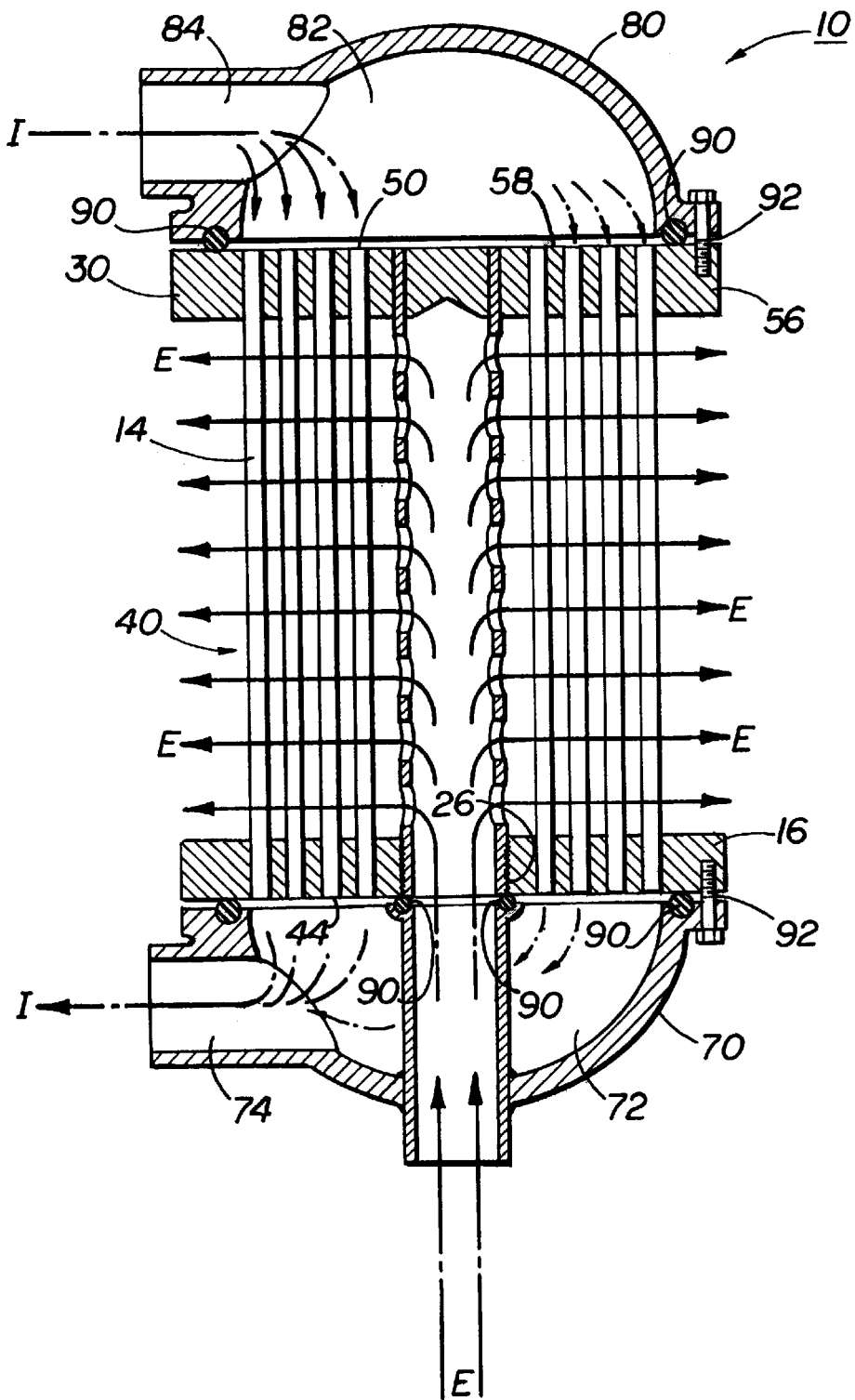
FIG. 3 shows a membrane contactor, in partial cross-sectional view, according to another preferred form of the present invention.
Figure 4:
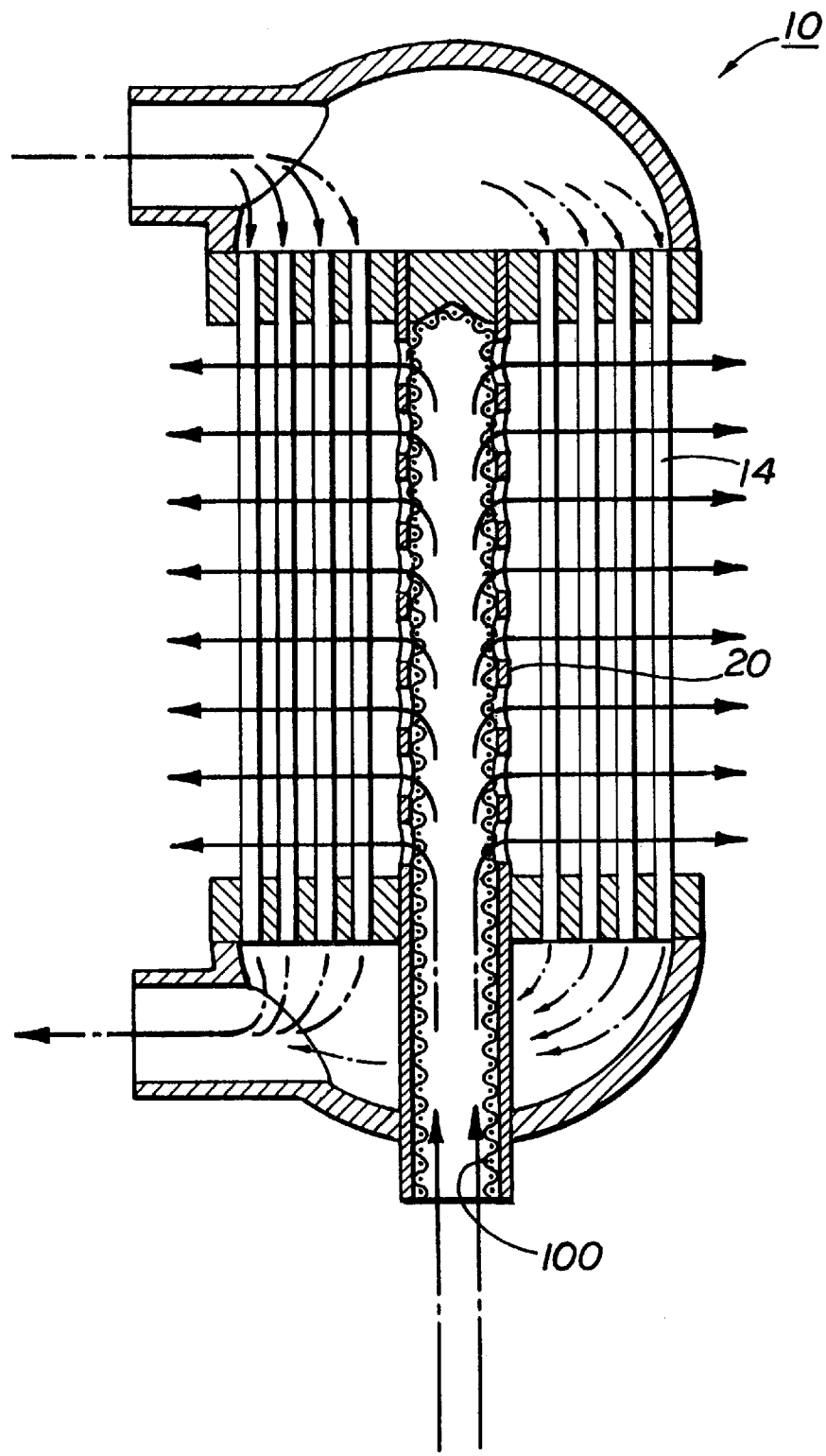
FIG. 4 shows a membrane contactor, in partial cross-sectional view, and including a filter element, according to another preferred form of the present invention.

In alternate embodiments, for example those depicted in FIGS. 2–4, the support member 30 can comprise a second tube sheet 56. The second tube sheet 56 sealingly engages the external surfaces of the second ends 50 of the hollow fiber membranes 14. The second ends 50 extend through the second tube sheet 56, and are preferably cut off or otherwise terminated approximately flush with an outer surface 58 of the second tube sheet 56, the outer surface 58 lying opposite the second tube sheet 56 from the perforated wall section 32 of the fluid distribution tube 20. The open second ends 50 form second ports communicating a lumen-side fluid I to and/or from the lumens of the hollow fiber membranes 14. In this manner, the lumen-side fluid I can traverse the contactor 10 through the lumens of the hollow fiber membranes 14, entering at one of the first or second ports and discharging from the other. The first and second tube sheets 16, 56 segregate the lumen-side fluid I from the shell-side fluid E. The second tube sheet 56 is preferably formed in substantially the same manner as the first tube sheet 16, from a polymeric potting resin. The second tube sheet 56 is preferably formed around or otherwise mounted in sealing engagement with the external surface 22 of the fluid distribution tube 20, adjacent its second end 28.

The fluid contactor 10 of the present invention can optionally also comprise one or more end caps. For example, and as seen best with reference to FIG. 1, a first end cap 70 can be provided in sealing engagement with the first tube sheet 16, to form a first chamber 72, open to fluid communication with the first ports of the hollow fiber membranes 14. The first end cap 70 may be a generally hemispherical or other hollow casing having a rim surface in connection with the outer periphery of the outer surface 46 of the first tube sheet 16. The first end cap 70 preferably comprises a first lumen-side fluid port 74 for receiving and/or discharging a flow of lumen-side fluid I. The first lumen-side fluid port 74 can be provided with threads or other couplings or fittings for attachment to an external fluid system. The first end 26 of the fluid distribution tube 20 extends through the first chamber 72, to provide a shell-side fluid port external of the first end cap 70. The first end 26 of the fluid distribution tube 20 can be provided with threads or other couplings or fittings for attachment to an external fluid system. The first end cap 70 can be integrally formed with the fluid distribution tube 20 as a unitary element, or the two can be formed as separate elements and joined or sealed to prevent the passage of fluid therebetween.

With reference now to FIG. 2, the fluid contactor 10 of the present invention can optionally further comprise a second end cap 80. The second end cap 80 is preferably provided in sealing engagement with the second tube sheet 56, to form a second chamber 82, open to fluid communication with the second ports of the hollow fiber membranes 14. The second end cap 80 may be substantially similar or identical to the first end cap 70, comprising a generally hemispherical or other hollow casing having a rim surface in fluid-tight connection with the outer periphery of the outer surface 58 of the second tube sheet 56. The second end cap 80 preferably comprises a second lumen-side fluid port 84 for receiving and/or discharging a flow of lumen-side fluid I. The second lumen-side fluid port 84 can be provided with threads or other couplings or fittings for attachment to an external fluid system. It will be understood that embodiments of the present invention incorporating a closure block as the support member 30, such as the embodiment depicted in FIG. 1, will typically not require the provision of a second end cap 80, as the hollow fiber membranes 14 do not extend through the closure block to present ports allowing communication of lumen-side fluid into a second chamber 82.

The fluid contactor 10 of the present invention can also comprise a removable and replaceable contactor cartridge for insertion in an external fluid delivery system incorporating endcaps or other components for fluid delivery to the fluid contactor 10. As seen with reference to FIG. 3, the fluid contactor 10 according to this embodiment of the present invention does not include first or second end caps 70, 80. Instead, sealing elements 90, such as O-rings or gaskets, can be provided between the tube sheet(s) 16, 56 and the cooperating components of the external housing, and between the first end 26 of the fluid distribution tube 20 and the cooperating components of the external housing. The sealing elements prevent loss of the lumen-side fluid I and the shell-side fluid E from the points of engagement between the fluid contactor 10 and the external housing, and maintain separation of the lumen-side fluid I from the shell-side fluid E. Clamps or other attachment means 92 can be provided for connecting the fluid contactor 10 to the external housing.

The fluid contactor 10 of the present invention can optionally also include a bag filter 100, or other filter means, mounted within the internal passage 24 of the fluid distribution tube 20. The bag filter 100 is preferably fabricated from an inert material, which is unreactive with the particular fluids or contaminants likely to be encountered during intended use. The bag filter 100 may or may not be removable for repair or replacement. The filter 100 assists in removal of particulate matter from the shell-side fluid E, which otherwise could clog the fiber bundle 40 and reduce the efficiency of the contactor 10. The particulate size rating of the filter 100 is preferably selected depending upon the closeness of packing of the hollow fiber membranes 14 in the fiber bundle 40. If the filter 100 is not removable (i.e., permanently attached within the internal passage 24 of the fluid distribution tube 20), the filter can be "back-flushed" periodically by reversing the flow direction within the fluid distribution tube 20 to dislodge and remove captured particles. If the filter 100 is removable, it can be periodically replaced or removed for cleaning.

The fluid contactor 10 of the present invention advantageously eliminates the need for a surrounding shell, and is therefore designated a "shell-less" fluid contactor. Elimination of a surrounding shell reduces weight and expense, and results in minimal pressure drop across the contactor. Structural support for the contactor 10, is primarily provided by the fluid distribution tube 20, which retains the barrier or first tube sheet 16 and the support member 30 in their intended configurations. Larger diameter fluid contactors may require additional support, which can be provided through the provision of one or more support rods (unshown) extending between the barrier or first tube sheet 16 and the support member 30. The hollow fiber membranes 14 are generally exposed to the ambient surroundings between the barrier or first tube sheet 16 and the support member 30.

Figure 5:
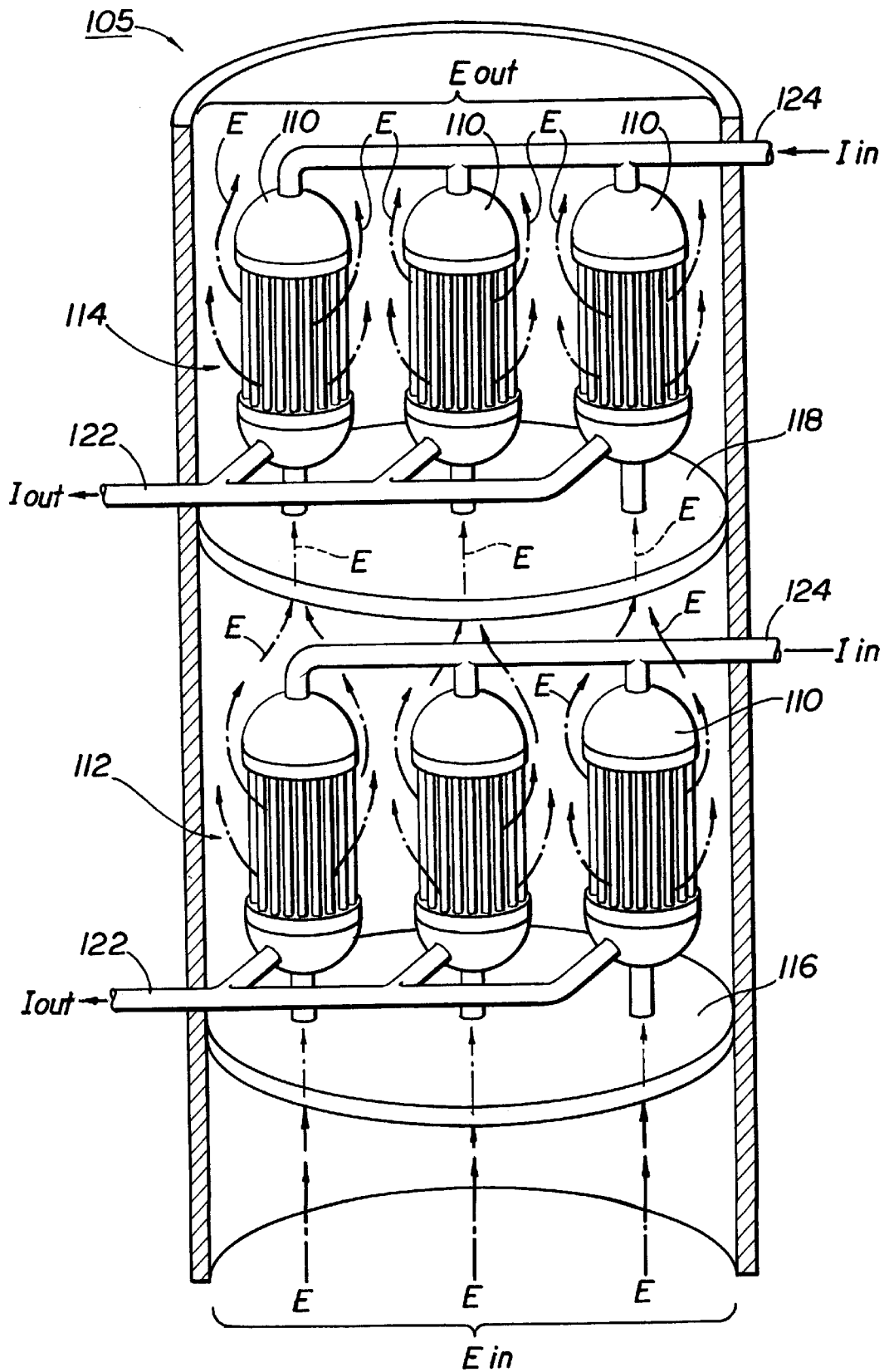
FIG. 5 shows a multi-stage assembly according to a preferred form of the present invention.

The present invention also includes the provision of a multi-stage contactor assembly 105 for fluid processing. With particular reference to FIG. 5, the assembly 105 preferably includes at least two stages, each stage comprising one or more fluid contactors 110. The assembly will be described with reference to the depicted two-stage contactor assembly 105, comprising a first stage 112 and a second stage 114. It will be understood that additional stages can be added to the system in substantially like manner, depending upon the desired system characteristics. At least one, and preferably all of the contactors 110 included in the assembly 105 comprise shell-less fluid contactors substantially as described above. Each stage 112, 114 preferably comprises a support base 116, 118, upon which the contactors 110 of the respective stages are mounted. Each support base 116, 118 can comprise, for example, a substantially rigid sheet or plate formed from an inert material. Each support base 116, 118 can be provided with one or more openings to accommodate passage of fluid conduits communicating lumen-side fluid and/or shell-side fluid to the contactors 110. The support bases 116, 118 can also serve as barriers to fluid passage between adjacent stages of the assembly 105, permitting fluid flow from one stage to the next only through the contactors 110. The assembly 105 preferably further comprises collection and transfer means for collecting the shell-side fluid E discharged from one stage, and transferring the collected shell-side fluid E to the second stage. For example, in the depicted embodiment, the collection and transfer means comprises the wall(s) 120 of a portion of a stack, discharge pipe or other conduit for an effluent process stream. In alternate embodiments, the collection and transfer means can comprise any fluid-tight enclosure surrounding one or more stages of the assembly. Inlet manifolds 122 and outlet manifolds 124 for the lumen-side fluid I can be provided. Preferably, the inlet manifolds 122 communicate fluid from an external source into the first lumen-side fluid ports 74 of each contactor 110, and the outlet manifolds 122 communicate fluid from the second lumen-side fluid ports 84 of each contactor 110 to an outlet.

In use, the fluid contactor 10 of the present invention enables a process for transferring one or more fluid components between a shell-side fluid E and a lumen-side fluid I. The shell-side fluid E is introduced into the fluid distribution element of the shell-less fluid contactor from an external source. For example, in the particular embodiments described above, the shell-side fluid E enters the first end 26 of the fluid distribution tube 20, and passes into the internal passage 24. The lumen-side fluid I is introduced into a lumen of at least one hollow fiber membrane external of the fluid distribution element. For example, in the particular embodiments described above, the lumen-side fluid I enters through the first and/or the second lumen-side fluid port 74, 84. The lumen-side fluid I is communicated through a lumen-side fluid port 74, 84, into the first and/or the second chamber 72, 82 within the respective endcap 70, 80, and is introduced into the lumens of the hollow fiber membranes through the first and/or second port of the hollow fiber membranes. As depicted in FIG. 5, the shell-side fluid E and the lumen-side fluid I can flow in generally opposite directions (counter-current flow). Alternatively, the shell-side fluid E and the lumen-side fluid I can flow in generally the same direction (parallel flow).

The shell-side fluid E is discharged from the fluid distribution element into contact with the external surface(s) of the at least one hollow fiber membrane to effect a transfer of a fluid component between the shell-side fluid and the lumen-side fluid. For example, in the particular embodiments described above, the shell-side fluid E is discharged from the openings or outlets 34 of the perforated wall section 32 into contact with the external surface(s) of the at least one hollow fiber membrane. Diffusion of one or more fluid components occurs across the microporous walls of the hollow fiber membranes, thereby providing a transfer of the component(s) between the shell-side fluid E and the lumen-side fluid I. The hollow fiber membranes 14 are selected for particular applications to prevent a fluid flow across the hollow fiber wall, thereby limiting transfer to diffusion across the hollow fiber wall, and enabling selective control of the transferred component(s). The driving force for the diffusion across the hollow fiber wall preferably is provided by a difference in concentration, partial pressure or, more generally, chemical potential, of the transferring component(s) between the shell-side fluid E and the lumen-side fluid I. The transfer can be selectively controlled by appropriate selection of the shell-side fluid E, the lumen-side fluid I, the material and thickness of the hollow fiber membrane, and/or the pressures or other conditions or characteristics of the fluids. In preferred form, the fluid component is transferred from the shell-side fluid E to the lumen-side fluid I. Alternatively, the fluid component can be transferred from the lumen-side fluid I to the shell-side fluid E.

The shell-side fluid E is preferably discharged from the fluid distribution tube 20 generally radially outwardly from a plurality of generally radial openings 34 extending from the internal passage 24 through the wall of the fluid distribution tube 20. The at least one hollow fiber membrane preferably comprises a plurality of hollow fiber membranes 14 forming a fiber bundle surrounding the plurality of generally radial openings 34. The shell-side fluid E preferably is distributed generally radially outwardly through the interstices between the plurality of hollow fiber membranes 14. The shell-side fluid E can be collected from the shell-less fluid contactor after contacting the external surface(s) of the at least one hollow fiber membrane to effect the transfer of the component(s) between the shell-side fluid E and the lumen-side fluid I. As discussed above with reference to FIG. 5, the collected shell-side fluid E can then be transferred to a second, and possibly further additional stages of fluid contactors for further processing, as desired.

Several example applications of the fluid contactor and process of the present invention will now be provided. The example applications are described to provide a better understanding of the invention, and are not intended to be limiting.

EXAMPLE 1

Vacuum-Assisted Liquid Degassing

One example application of the present invention provides for degassing of water or other liquids through the application of a partial vacuum (i.e., a negative pressure differential) to the lumens of the hollow fiber membranes. This application can be practiced using a fluid contactor having hollow fiber membranes open at a first end thereof, and closed at a second end, such as by a closure block as shown in FIG. 1, by applying vacuum to the single lumen-side fluid port. Alternatively, this application can be practiced using a fluid contactor having hollow fiber membranes open at both ends, as shown in FIGS. 2–4, by applying vacuum to both lumen-side fluid ports, or by blocking one lumen-side fluid port and applying vacuum to the other.

Water or other liquid to be degassed enters the contactor as the shell-side fluid through the first end of the fluid distribution tube, and is discharged outwardly from the perforated wall section into contact with the fiber bed. The contactor can be submerged in a plenum from which water is continuously discharged, or a plurality of contactors can be installed in a single container. The hollow fibers are preferably hydrophobic, or have a gas-permeable dense skin on their external surfaces, thereby preventing water transfer across the wall of the hollow fibers. An external vacuum source applies a vacuum to the lumens of the hollow fibers. Dissolved gasses are stripped from the liquid, diffusing across the fiber walls and into the lumens of the hollow fibers. The gasses are removed from the lumens through the lumen-side fluid ports, and can be discharged to the atmosphere, or collected. The degassed liquid exits the contactor through the fiber bundle, and can be collected, and optionally can be transferred to additional stages for further processing.

EXAMPLE 2

Sweep Gas Transfer

Another example application of the present invention provides transfer of a fluid component from the shell-side fluid to a lumen-side sweep gas. This application is preferably practiced using a fluid contactor having hollow fiber membranes open at both ends, as shown in FIGS. 2–4, by introducing the lumen-side sweep gas into one lumen-side fluid port and discharging the lumen-side sweep gas from the other lumen-side fluid port. Optionally, vacuum can be simultaneously applied to the discharge port. End caps can be provided at either or both ends of the contactor, as desired. The transferred component diffuses through the wall of the hollow fiber membrane from the shell-side fluid into the lumen-side sweep gas. The sweep gas, is thereby enriched with the transferred component, and the shell-side fluid is depleted of the transferred component. This method of application can be coupled with the method of Example 1 above. For example, water can be first degassed by vacuum according to Example 1, to remove a substantial portion of dissolved gasses, including oxygen. The degassed water discharged from the vacuum contactor of Example 1 is then collected and transferred to a sweep gas contactor. The level of dissolved oxygen in the water is further reduced by diffusion into a sweep gas, such as nitrogen, in the sweep gas contactor.

EXAMPLE 3

Stripping of Gas Components into a Liquid Absorbent

In a further variation, the fluid contactor of the present invention can be used to process a gas or waste air stream, prior to discharge to the atmosphere, by removal and transfer of toxic or harmful components from the gas stream into a suitable liquid absorbent. This application is preferably practiced using a fluid contactor having hollow fiber membranes open at both ends, as shown in FIGS. 2–4. The gas stream to be processed is introduced as the shell-side fluid through the fluid distribution tube and flows radially outward and transversely over the fiber bed before being discharged directly into the atmosphere. A suitable liquid absorbent is provided as the lumen-side fluid. The liquid absorbent is prevented from entering the pores of the hollow fiber wall either by the surface exclusion property of the fine pores or due to the presence of a highly gas-permeable, thin, dense skin on the inside surface of the fiber wall. Toxic or harmful components from the gas stream diffuse through the wall of the hollow fiber membranes, from the gas stream into the liquid absorbent.

EXAMPLE 4

Extraction of Organic Components from Aqueous Stream

In a further variation, the fluid contactor of the present invention can be used to extract organic contaminants or pollutants from aqueous streams, such as waste streams, prior to discharge to the environment or recycle use. This application is preferably practiced using a fluid contactor having hollow fiber membranes open at both ends, as shown in FIGS. 2–4. The lumen-side fluid is any suitable non-toxic organic solvent which serves as an extractant to selectively remove the target organic contaminants from water or aqueous fluids. The aqueous stream is the shell-side fluid. Organic contaminants or pollutants diffuse through the wall of the hollow fiber membranes, from the water or aqueous fluid into the organic extractant.

EXAMPLE 5

Extraction of Inorganic Solute from Organic Solvent

In another variation, the fluid contactor of the present invention can be used to extract dissolved inorganic salt impurities from an organic solvent. This can be achieved by contacting the organic solvent, through the walls of the hollow fiber membranes, with water or other aqueous material, which selectively leaches the salt from the solvent. This application is preferably practiced using a fluid contactor having hollow fiber membranes open at both ends, as shown in FIGS. 2–4. The organic liquid to be processed serves as the shell-side fluid, and the wash water or other aqueous material serves as the lumen-side fluid. Inorganic salt impurities diffuse through the wall of the hollow fiber membranes, from the organic liquid into the wash water or other aqueous material.

While the invention has been described in its preferred forms, it will be readily apparent to those of ordinary skill in the art that many additions, modifications and deletions can be made thereto without departing from the spirit and scope of the invention.

What is claimed is:

1. A process for transferring a fluid component between a shell-side fluid and a lumen-side fluid, said process comprising:
   (a) introducing a shell-side fluid into a fluid distribution element of a shell-less fluid contactor;
   (b) introducing a lumen-side fluid into a lumen of at least one hollow fiber membrane external of the fluid distribution element; and
   (c) discharging the shell-side fluid from the fluid distribution element into contact with the at least one hollow fiber membrane to effect diffusion of a fluid component between the shell-side fluid and the lumen-side fluid.

2. The process of claim 1, wherein the fluid distribution element comprises a fluid distribution tube having a plurality of openings extending generally radially outwardly from a hollow interior of the tube, and wherein a plurality of hollow fiber membranes are provided to form a fiber bundle surrounding the plurality of openings of the fluid distribution tube, and wherein the step of discharging the shell-side fluid comprises discharging shell-side fluid from the plurality of openings of the fluid distribution tube into contact with the fiber bundle.

3. The process of claim 1, further comprising collecting shell-side fluid from the shell-less fluid contactor and transferring the collected shell-side fluid to a second fluid contactor for further processing.

4. The process of claim 1, wherein the fluid component is transferred from the shell-side fluid to the lumen-side fluid.

5. A shell-less fluid contactor comprising:
   (a) a fluid distribution element comprising at least one inlet for receiving a shell-side fluid, and at least one outlet for discharging the shell-side fluid;
   (b) at least one hollow fiber membrane being adapted for diffusion, said membrane having an internal surface defining a lumen and an external surface exposed to contact with the shell-side fluid, each said at least one hollow fiber membrane further comprising a first port in fluid communication with said lumen; and
   (c) a barrier for separating the first port of each said at least one hollow fiber membrane from the shell-side fluid.

6. The fluid contactor of claim 5, wherein at least a portion of the external surface of each said at least one hollow fiber membrane extends adjacent the at least one outlet of said fluid distribution element.

7. The fluid contactor of claim 5, wherein said fluid distribution element comprises a tube having an open first end forming the at least one inlet, and a perforated wall section forming the at least one outlet.

8. The fluid contactor of claim 7, wherein said fluid distribution tube is substantially rigid.

9. The fluid contactor of claim 7, comprising a plurality of said hollow fiber membranes forming a fiber bundle, said fiber bundle surrounding at least a portion of the perforated wall section.

10. The fluid contactor of claim 9, wherein said barrier comprises a first tube sheet in sealing contact with the external surface of a first end of each hollow fiber membrane.

11. The fluid contactor of claim 10, wherein said first tube sheet is mounted in sealing engagement with the fluid distribution tube between the first end of the fluid distribution tube and the perforated wall section, and wherein a first end of each hollow fiber membrane extends through the first tube sheet in sealing engagement therewith, whereby the first port of each hollow fiber membrane is opposite the first tube sheet from the perforated wall section of the fluid distribution tube.

12. The fluid contactor of claim 11, further comprising a first end cap in sealing engagement with the first tube sheet to form a first chamber open to fluid communication with the first port of each hollow fiber membrane.

13. The fluid contactor of claim 12, comprising a second tube sheet mounted adjacent a second end of the fluid distribution tube in sealing contact with the external surface of a second end of each hollow fiber membrane, whereby a second port of each hollow fiber membrane is opposite the second tube sheet from the perforated wall section of the fluid distribution tube, said fluid contactor further comprising a second end cap in sealing engagement with the second tube sheet to form a second chamber open to fluid communication with a second port of each hollow fiber membrane.

14. The fluid contactor of claim 10, further comprising a second tube sheet in sealing contact with the external surface of a second end of each hollow fiber membrane.

15. The fluid contactor of claim 10, wherein second ends of each hollow fiber membrane opposite the first end are closed.

16. The fluid contactor of claim 15, further comprising a closure block mounted adjacent a second end of the fluid distribution tube, said closure block engaging and closing the second ends of each hollow fiber membrane.

17. The fluid contactor of claim 7, further comprising a bag filter within the fluid distribution tube.

18. An assembly for fluid processing, said assembly comprising:

(a) a first stage means comprising at least one shell-less fluid contactor being adapted for diffusion;

(b) a second stage means comprising at least one fluid contactor being adapted for diffusion; and (c) collection and transfer means for collecting shell-side fluid discharged from one of the first stage or the second stage, and transferring the collected shell-side fluid to the other of the first or second stage.

19. The assembly of claim 18, wherein each said at least one shell-less fluid contactor of the first stage comprises:

(i) a fluid distribution tube having at least one inlet for receiving a shell-side fluid, and at least one outlet for discharging the shell-side fluid;

(ii) at least one hollow fiber membrane comprising a microporous wall, said microporous wall having an internal surface defining a lumen and an external surface exposed to contact with the shell-side fluid, each hollow fiber membrane further comprising a first port in fluid communication with said lumen; and (iii) a barrier for separating the first port of each said at least one hollow fiber membrane from the shell-side fluid.

20. The assembly of claim 18, wherein said collection and transfer means comprises a portion of a conduit for an effluent process stream.

* * * * *